US012585354B2

(12) United States Patent
Perlin et al.

(10) Patent No.: US 12,585,354 B2
(45) Date of Patent: *Mar. 24, 2026

(54) MECHANICAL FORCE REDISTRIBUTION SENSOR ARRAY EMBEDDED IN A SINGLE SUPPORT LAYER

(71) Applicants:Kenneth Perlin, New York, NY (US); Charles Hendee, Manteca, CA (US); Alex Grau, Astoria, NY (US)

(72) Inventors: Kenneth Perlin, New York, NY (US); Charles Hendee, Manteca, CA (US); Alex Grau, Astoria, NY (US)

(73) Assignees: Tactonic Technologies, LLC, New York, NY (US); New York University, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,242

(22) Filed: May 10, 2024

(65) Prior Publication Data

US 2024/0295933 A1     Sep. 5, 2024

Related U.S. Application Data

(62) Division of application No. 14/743,668, filed on Jun. 18, 2015, now Pat. No. 11,983,352.

(60) Provisional application No. 62/016,437, filed on Jun. 24, 2014.

(51) Int. Cl.
*G06F 3/041* (2006.01)
*G06F 1/16* (2006.01)
*G06F 3/044* (2006.01)

(52) U.S. Cl.
CPC ........... *G06F 3/04144* (2019.05); *G06F 1/16* (2013.01); *G06F 3/044* (2013.01); *G06F 2203/04102* (2013.01)

(58) Field of Classification Search
CPC ............. G06F 3/04144; G06F 3/04142; G06F 3/04146; G06F 3/044; G06F 3/045; G06F 1/16; G06F 2203/04102; G06F 2203/04104; G06F 2203/04105; G06F 2203/04106
See application file for complete search history.

(56) References Cited

U.S. PATENT DOCUMENTS

| | | | |
|---|---|---|---|
| 11,983,352 B2* | 5/2024 | Perlin ................. | G06F 3/04144 |
| 2014/0085253 A1* | 3/2014 | Leung ................... | G06F 3/0445 |
| | | | 345/174 |
| 2015/0331524 A1* | 11/2015 | McMillen ............... | G01L 1/205 |
| | | | 345/174 |

* cited by examiner

*Primary Examiner* — Vijay Shankar
(74) *Attorney, Agent, or Firm* — Ansel M. Schwartz

(57) ABSTRACT

An MFR sensor array having a first supporting layer. The array has a second supporting layer. The array has a force sensing component disposed between the first and second supporting layers. The array has protrusions combined with the force supporting component, where there are only two supporting layers. When a force is applied to the second supporting layer, the force causes the second supporting layer to contact protrusions so the force is transmitted through the protrusions to the force supporting component and through the force supporting component. An MFR sensor array. A system for sensing. A method for sensing.

13 Claims, 11 Drawing Sheets

MECHANICAL FORCE REDISTRIBUTION SENSOR ARRAY EMBEDDED IN A SINGLE SUPPORT LAYER

CROSS-REFERENCE TO RELATED APPLICATIONS

This is a divisional of U.S. patent application Ser. No. 14/743,668 filed Jun. 18, 2015, now U.S. Pat. No. 11,983, 352, which is a non-provisional application of U.S. provisional patent application Ser. No. 62/016,437 filed Jun. 24, 2014, incorporated by reference herein.

FIELD OF THE INVENTION

The present invention is related to a mechanical force redistribution sensor array. (As used herein, references to the "present invention" or "invention" relate to exemplary embodiments and not necessarily to every embodiment encompassed by the appended claims.) More specifically, the present invention is related to a mechanical force redistribution sensor array having no more than two support layers.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The use of mechanical force redistribution (MFR) for sensing arrays, U.S. patent application Ser. No. 13/847,236, incorporated by reference herein, allows force imaging sensors to be made at low cost, since (1) the number of force sensing elements in such sensors is small in comparison to the accuracy they provide for localizing multiple touches, and (2) materials cost is very low, in comparison with related technologies such as TekScan [Hollinger A, Wanderley MM. Evaluation of Commercial Force Sensing Resistors. Proceedings of International Conference on New Interfaces for Musical Expression; Paris, France. 4-8 Jun. 2006] and IFSR [Rosenberg, I., Perlin, K., The UnMousePad, ACM/SIGGRAPH 2009].

BRIEF SUMMARY OF THE INVENTION

An MFR sensor array having a force sensing component. The array having protrusions combined with the force sensing component to define one or two supporting layers, wherein a first embodiment there is only one supporting layer and in a second embodiment, there is only two supporting layers. A system for sensing. A method for sensing.

The present invention pertains to an MFR sensor array. The array comprises a first supporting layer. The array comprises a second supporting layer. The array comprises a plurality of individual distinct separate and apart force sensing components disposed between the first and second supporting layers. The array comprises protrusions combined with the force supporting component, where there are only two supporting layers. When a force is applied to the second supporting layer, the force causes the second supporting layer to contact protrusions so the force is transmitted through the protrusions to the force supporting component and through the force supporting component.

The present invention pertains to a MFR sensor array. The array comprises a single supporting layer. The array comprises a plurality of individual distinct separate and apart force sensing component disposed on the single supporting layer. The array comprises protrusions combined with the force sensing components on the single supporting layer, where there is only one supporting layer.

The present invention pertains to a system for sensing. The system comprises an MFR sensor array having only two supporting layers. The system comprises a computer connected to the array. The system comprises a monitor connected to the computer.

The present invention pertains to a system for sensing. The system comprises an MFR sensor array having only two supporting layers. The system comprises a computer connected to the array which receives signals from the array associated with sensed pressures. The computer interprets the signals of sensed pressures to determine a centroid of an impinging touch on the array which caused the sensed pressures.

The present invention pertains to a method for sensing. The method comprises the steps of imparting force from above onto a top surface layer of an MFR sensor array having only two supporting layers. There is the step of causing prompting signals by a computer in communication with the sensor array to be sent to the sensor array. There is the step of reconstructing with the computer a continuous position of force on the surface layer from interpolation based on data signals received from a grid of wires in the array.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
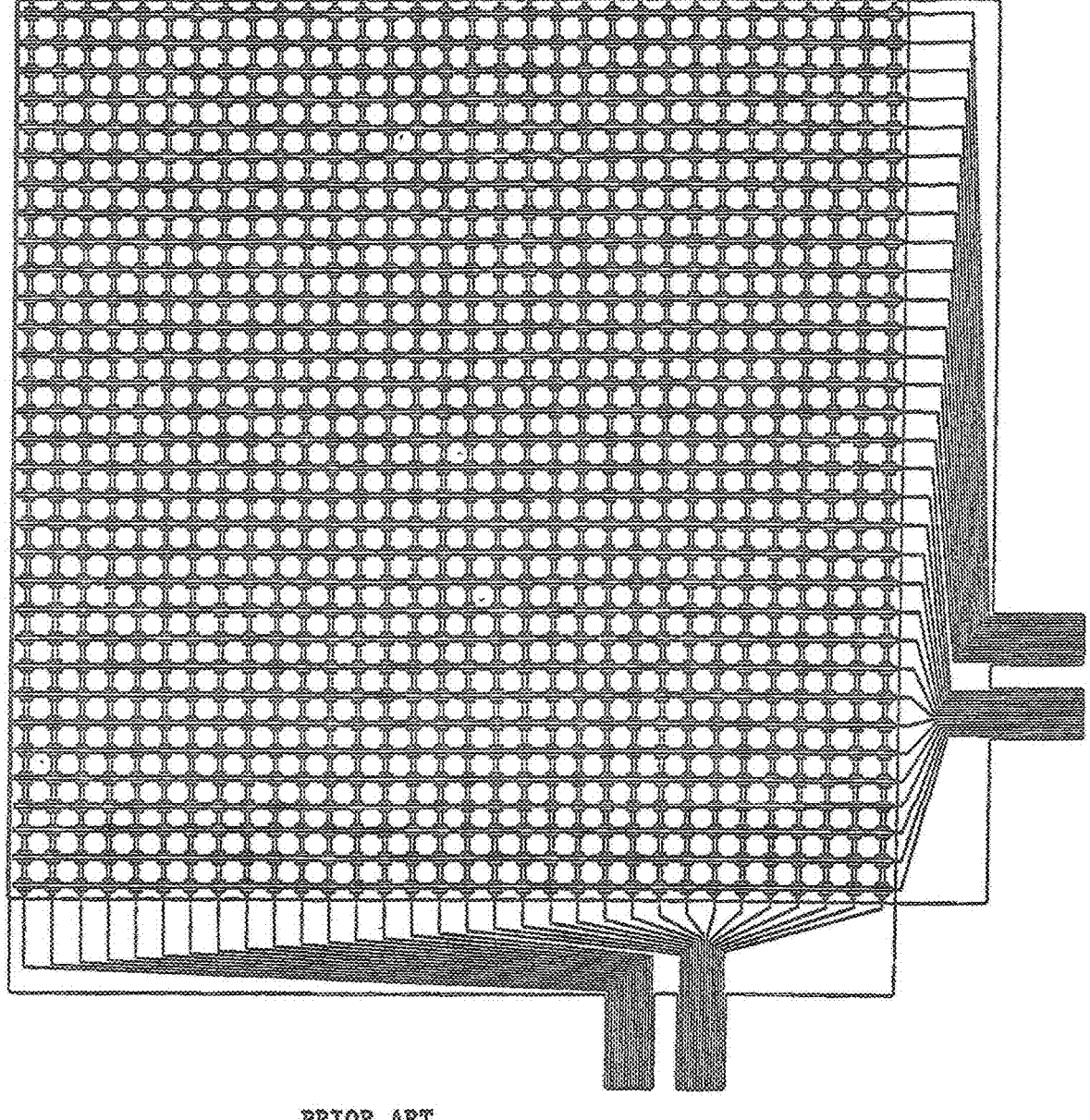
FIG. 1 shows an example of a previous instantiations of MFR.
Figure 2:
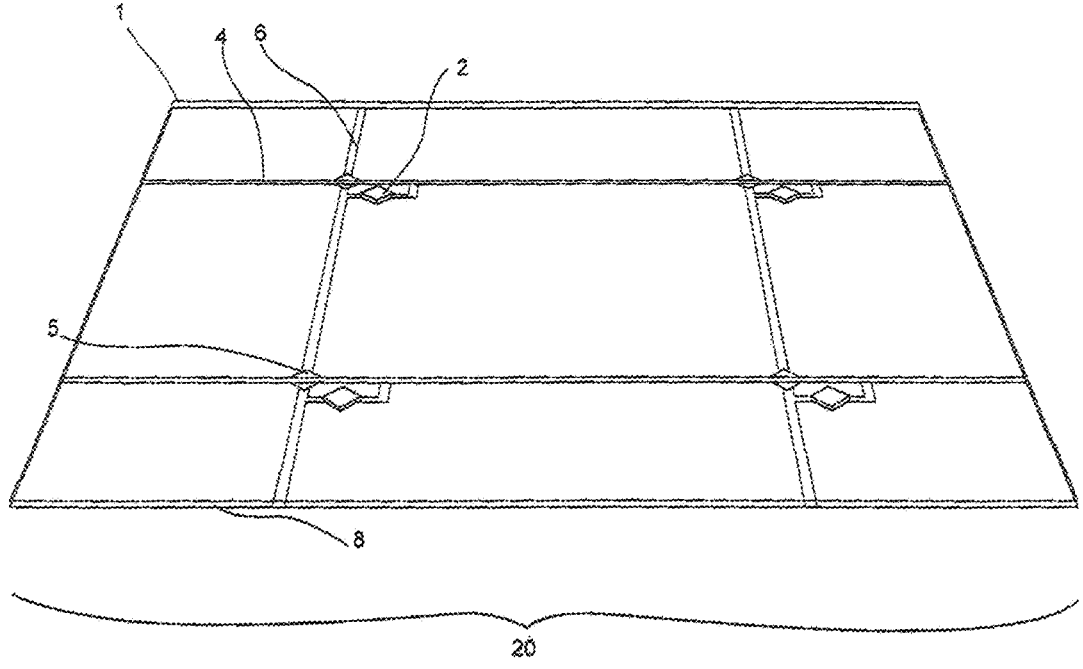
FIG. 2 shows an implementation of single support MFR sensor.
Figure 3:
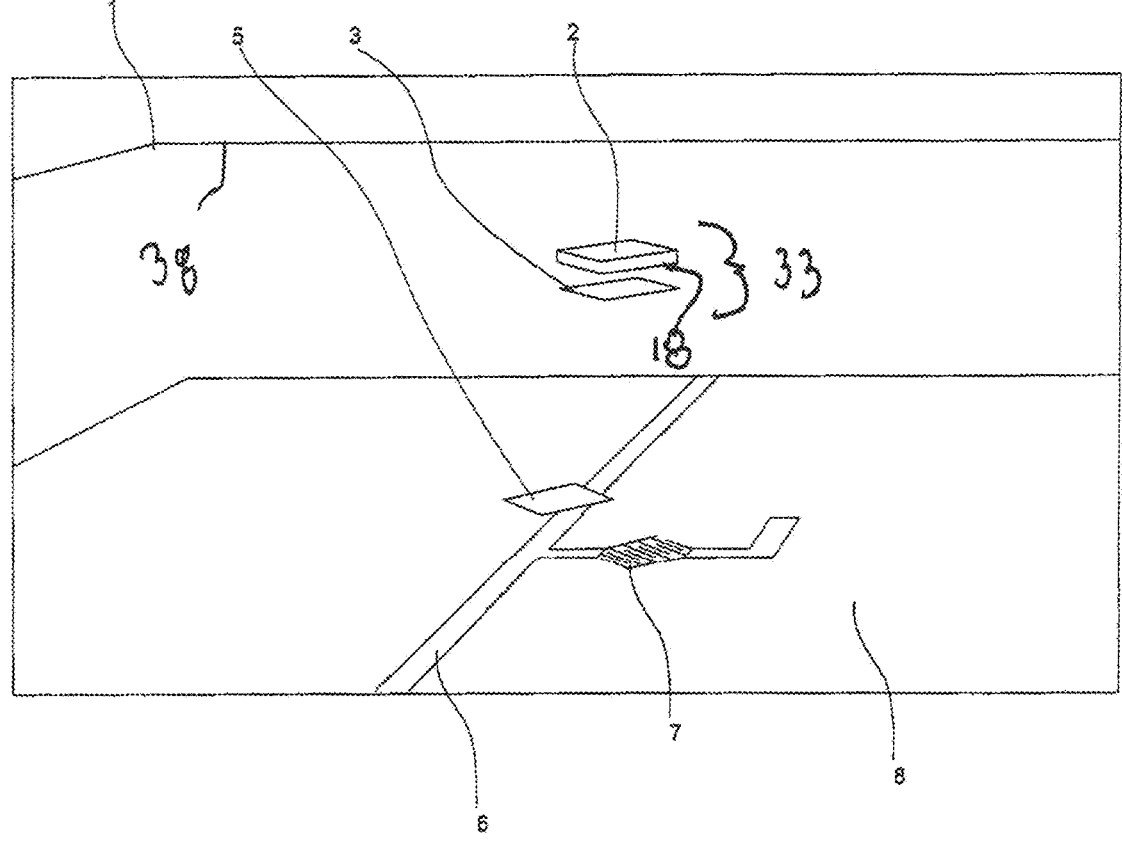
FIG. 3 shows the separate layers in the single support MFR sensor of FIG. 2.

Referring now to the drawings wherein like reference numerals refer to similar or identical parts throughout the several views, and more specifically to FIGS. 1-3 thereof, there is shown an MFR sensor array 20. The array 20 comprises a first supporting layer 8 that is preferably flat. The array 20 comprises a second supporting layer 1 that is preferably flat. The array 20 comprises a plurality of individual distinct separate and apart force sensing components 3 disposed between the first and second supporting layers 8, 1. The array 20 comprises a plurality of individual distinct separate and apart protrusions 2 combined with the force supporting components 3, where there are only two supporting layers. When a force is applied to the second supporting layer 1, the force causes the second supporting layer 1 to contact protrusions 2 so the force is transmitted through the protrusions 2 to the force supporting components 3 and through the force supporting components 3.

Each protrusion 2 may have an underside 18 and the force sensing component 3 may be a coating on the underside 18 of each protrusion 2. Each individual force sensing component 3 and each individual protrusion 2 may define a single force sensing protrusion component 33. Each force sensing protrusion component 33 may be affixed atop a corresponding shunt circuit 7 below the force sensing protrusion component 33 and not to the underside 38 of the second supporting layer 1 and all components 33 are attached to the first supporting layer 8 so no components are affixed to the second support layer 1 and the second support layer 1 has a smooth flat surface. The plurality of single individual protrusion components may be alongside each other and together define a plane in parallel with the first supporting layer In one embodiment of the array 20 only the first of the first and second supporting layers 8, 1 may contain electronic components, whereas the second supporting layer 1 is a simple undifferentiated sheet of material, such as metal, wood, glass or other semi-rigid material, that acts as a topmost touch layer. The array 20 may include a plurality of lines 4 of conducting ink disposed on the first supporting layer 8 connected to all shunt circuits 7. There may be a first set of lines 4 that extend perpendicularly with respect to a second set of lines 6 of conducting ink on the first supporting layer 8. The array 20 may include a patch 5 of dielectric material disposed between each line 4 of conducting ink of the first set of lines 4 and each line 6 of the second set of lines 6 of the second set of lines 6 where the line 4 and the line 6 intersect, with the patch 5 having an area about a little larger than the intersection area of the line 4 and the line 6. Each sensing component 33 may be one piece made out entirely of FSR material, so the protrusion 2 and force sensing component 3 that form the protrusion component 33 is one continuous piece of the same material. The sensor array 20 may be rolled up when not in use. The array 20 may be embedded in a display 23.

In another embodiment, the first supporting layer 8 may act as a topmost touch layer, an electronics bearing surface of the first supporting layer 8 faces downward away from a sensed external force, and in which a second, undifferentiated supporting layer is positioned underneath the first supporting layer 8. The second supporting layer 1 may be an external surface, such as a floor or wall or table top or desk top, underneath the first supporting layer 8 so that the sensor array 20 itself contains only a single supporting layer.

The present invention pertains to a MFR sensor array 20. The array 20 comprises a single supporting layer 8. The array 20 comprises a force sensing component 3 disposed on the single supporting layer. The array 20 comprises protrusions 2 combined with the force sensing component 3 on the single supporting layer, where there is only one supporting layer.

Figure 9:
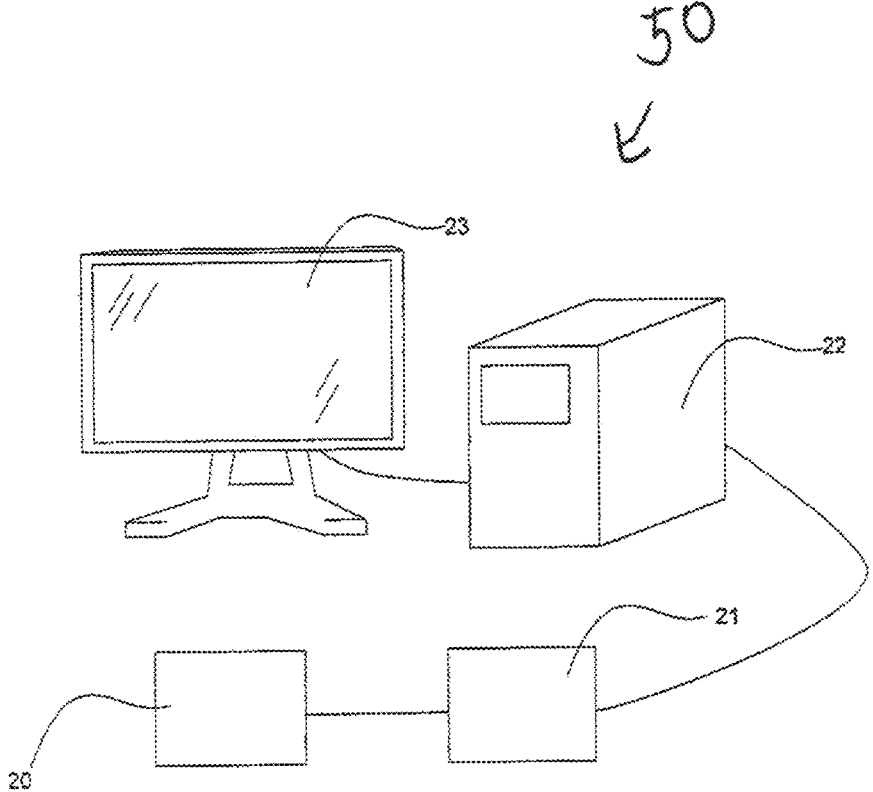
FIG. 9 shows a single-support MFR sensor 20 connected to a PCB 21 connected to a computer 22 and a monitor 23.

The present invention pertains to a system 50 for sensing, as shown in FIG. 9. The system, as shown in FIG. 9, comprises an MFR sensor array 20 having only two supporting layers. The system comprises a computer 22 connected to the array 20. The system comprises a display 23 connected to the computer 22. There can be a plurality of sensor arrays 28 in electrical connection to the computer 22.

The present invention pertains to a system 50 for sensing. The system 50 comprises an MFR sensor array 20 having only two supporting layers. The system 50 comprises a computer 22 connected to the array 20 which receives signals from the array 20 associated with sensed pressures. The computer 22 interprets the signals of sensed pressures to determine a centroid of an impinging touch on the array 20 which caused the sensed pressures.

The present invention pertains to a method for sensing. The method comprises the steps of imparting force from above onto a top surface layer of an MFR sensor array 20 having only two supporting layers. There is the step of causing prompting signals by a computer 22 in communication with the sensor array 20 to be sent to the sensor array 20. There is the step of reconstructing with the computer 22 a continuous position of force on the surface layer from interpolation based on data signals received from a grid of wires in the array 20. There may be the step of rolling up the sensor array 20.

The sensor array 20 of the present invention may replace previous sensor arrays described in U.S. patent application Ser. No. 13/847,236, incorporated by reference herein, and the sensor array 20 of the present invention is connected into the systems previously described in U.S. patent application Ser. No. 13/847,236 in the same way as the previous sensor arrays it replaces for operation of such systems.

Utility

Previous descriptions of MFR have assumed that the sensor sheet requires not only sensing elements and electrical connections, but also several (at least 3) physical layers upon which to mount those components (FIG. 1).

In this discussion, a "supporting layer" refers to any layer of a multi-layer sensing device which is capable of mechanically holding in place and/or providing physical support for component elements of the device, including layers, surfaces or materials onto which components of a circuit are attaches, connected, or adhered, and extend over large areas as compared to the components placed on the layer. Examples of supporting layers are thin sheets of plastic (e.g., Polyethylene Terephthalate or PET) or glass or metal. In contrast, a coat of ink or paint or a protrusion 2 is not a supporting layer.

The innovation hereby described is a way to embed MFR within existing supporting layers, such as are found in flat screen displays, so that the MFR can make use of those existing supporting layers, without adding any additional supporting layers. This innovation drastically reduces cost of the MFR component, which at 2014 prices can thereby become lower than $1.00 per square foot.

Force imaging sensor arrays are generally composed of a grid of piezoresistor based switches, where a common embodiment uses a carbon-based ink that acts as a Force Sensitive Resistor. A Force Sensitive Resistor (FSR) sensing switch requires at least two supporting layers. For example, in a shunt or interdigitated arrangement, a pattern of connective ink, consisting of two interleaved half patterns which are in near proximity to one another but not in contact with one another, is painted onto the top surface of a first supporting layer 8, and FSR material is placed on the bottom surface of a second supporting layer 1 which rests atop the first supporting layer 8, usually as ink through a screen (or other) printing process.

When increasing downward force is applied to the top surface of the supporting layer, the surface area between the FSR ink and the interleaved connectors increases, thereby providing increasing electrical conductance between the two halves of the interleaved connector pattern.

In previous descriptions of MFR, at least one additional supporting layer is required, to support physical protrusions 2 that concentrate force onto the FSR cells. These protrusions 2 are incorporated in one of two scenarios: (A) They are affixed to the top of the second physical layer, pointing upward, so that a third supporting layer rests upon them (though the entire sensing film may by flipped so that the protrusions 2 face downward onto whatever surface the film would have been resting on, adhered to, or otherwise would provide normal forces where the film itself acts as third supporting layer), or (B) they are fixed to the bottom of a third supporting layer, pointing downward, so that they will rest upon the second supporting layer 1.

The key non-obvious innovation described herein is to paint force sensing materials, such as piezoresistive FSR, on the ends of the protrusions 2, or by incorporating a force sensing material as part of the protrusion 2 itself. This allows a variant of scenario (B) above, with the second and third supporting layers being replaced by a single supporting layer. The reason this is non-obvious is that two completely different features—from the point of view of functionality— are being combined into a single element. The two features are:

(1) The physically raised protrusions 2 that form part of the process of mechanical interpolation, and (2) The element that actually converts force into electrical variation. Herein three embodiments of that element are mentioned: (a) FSR painted on the surface of the protrusion 2, (b) making the protrusion 2 itself out of volumetric FSR material (the same material that is used in Velostat), and (c) make the protrusion 2 itself out of a compressible or compliant dielectric material, which is used to form a capacitive force plate.

In all previously described incarnations of mechanically interpolated force-responsive grid sensors, the protrusions 2 and the force-active element were completely separate. It is believed that nobody before has ever described those two functional components as being embodied in a single element. This arrangement allows MFR sensing to be incorporated into an existing multilayered structure, such as a flat screen display 23, without requiring the introduction of physical supporting layers that are not already present in the flat screen display 23.

In one embodiment, the combined protrusions 2 and FSR component 3 is affixed to the bottom face of a transparent cover layer. The electrical connectors and shunt pattern are affixed to the upper face of the supporting layer just below the transparent cover layer.

Components:

A second, upper supporting layer 1. In one embodiment which is a display device, this layer can be either entirely transparent or can contain transparent regions.

Protrusions 2. These can be either on the underside 18 of the second, upper supporting layer or, in some embodiments, on the upper side of a first, lower support layer 8. In one embodiment, each protrusion 2 is 0.1 mm thick, and protrusions 2 are placed every 6.0 mm in a square grid arrangement. This is not to imply that these measurements are required for functionality. The protrusion 2 height and grid pitch spacing may vary depending on design requirements.

Force sensing material 3 on the downward facing tip 35 of each protrusion 2. In this embodiment, FSR is painted, printed, stamped, or otherwise applied to the end or tip 35 of each protrusion 2 which then is applied so that the FSR painted tip 35 is situated on top of or above each shunt circuit 7 patterned area. With FSR a slight airgap is often preferred so that little to no signal passes through due to the very high resistance (usually in the 10's of Mega Ohms) until force or mechanical strain is applied, increasing contact surface area and thereby decreasing resistance and increasing conductance.

Figure 5:
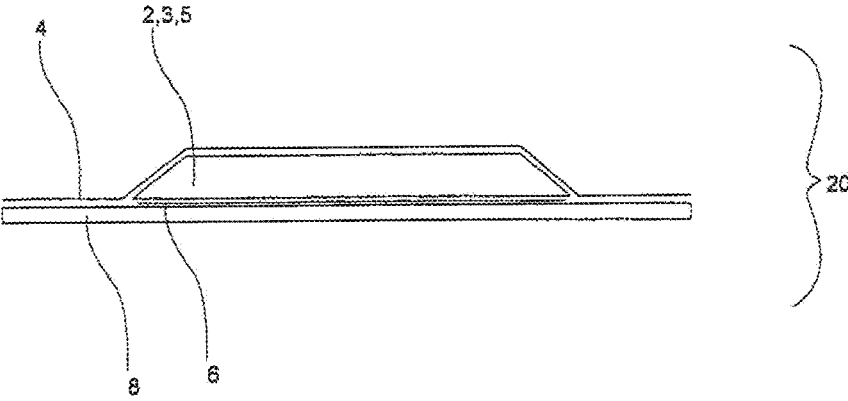
FIG. 5 shows a side view of an implementation where the force sensing material is the protrusion.
Figure 6:
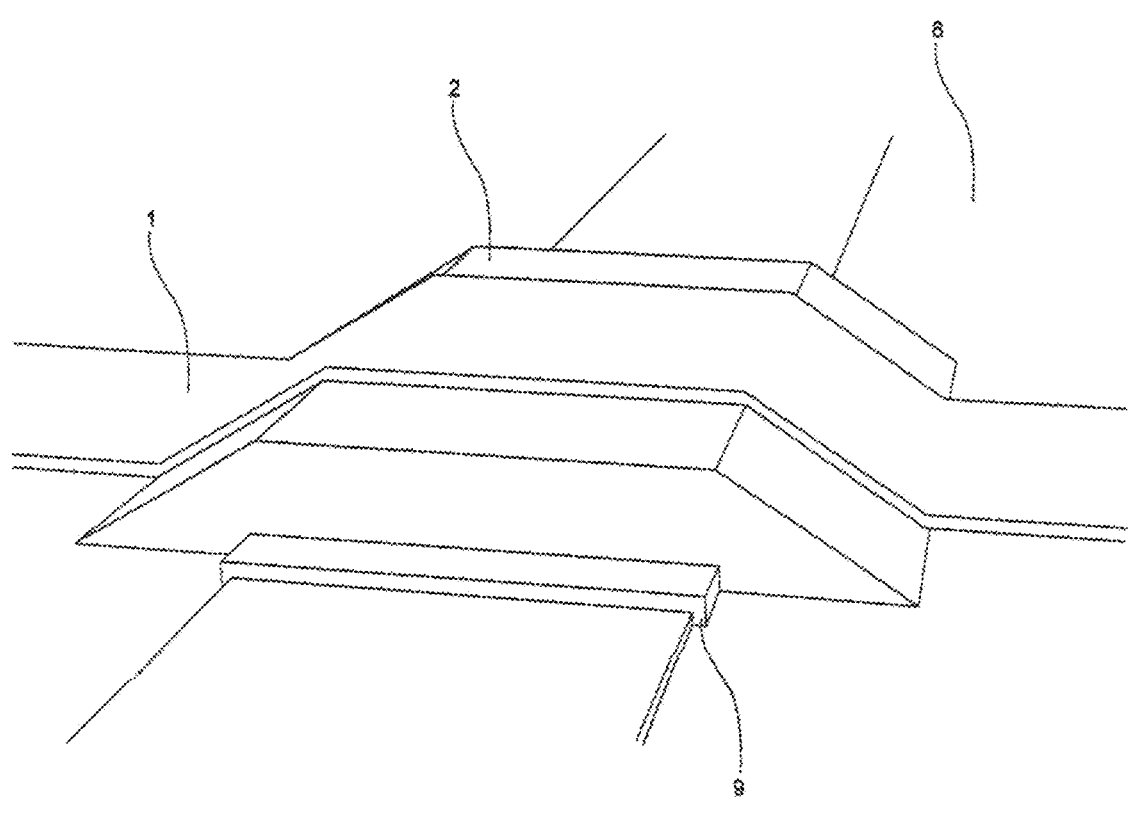
FIG. 6 shows an implementation where the force sensing material is the protrusion and a printed diode is incorporated.

Alternatively, the force sensing component 3 can be combined with the protrusions 2 in a single "force sensing protrusion" component 33, by making the protrusion 2 itself out of force sensing material, like a piezoresistive material (a material whose electrical conductance increases when mechanical strain is or a force is applied) such as Velostat or Linqstat pressure-sensitive conductive sheet. In fact, this embodiment would work with any piezoresistive or piezoelectric material, though sensors produced with different materials or force transducers may vary in signal range and/or quality (FIGS. 5 & 6).

Figure 4:
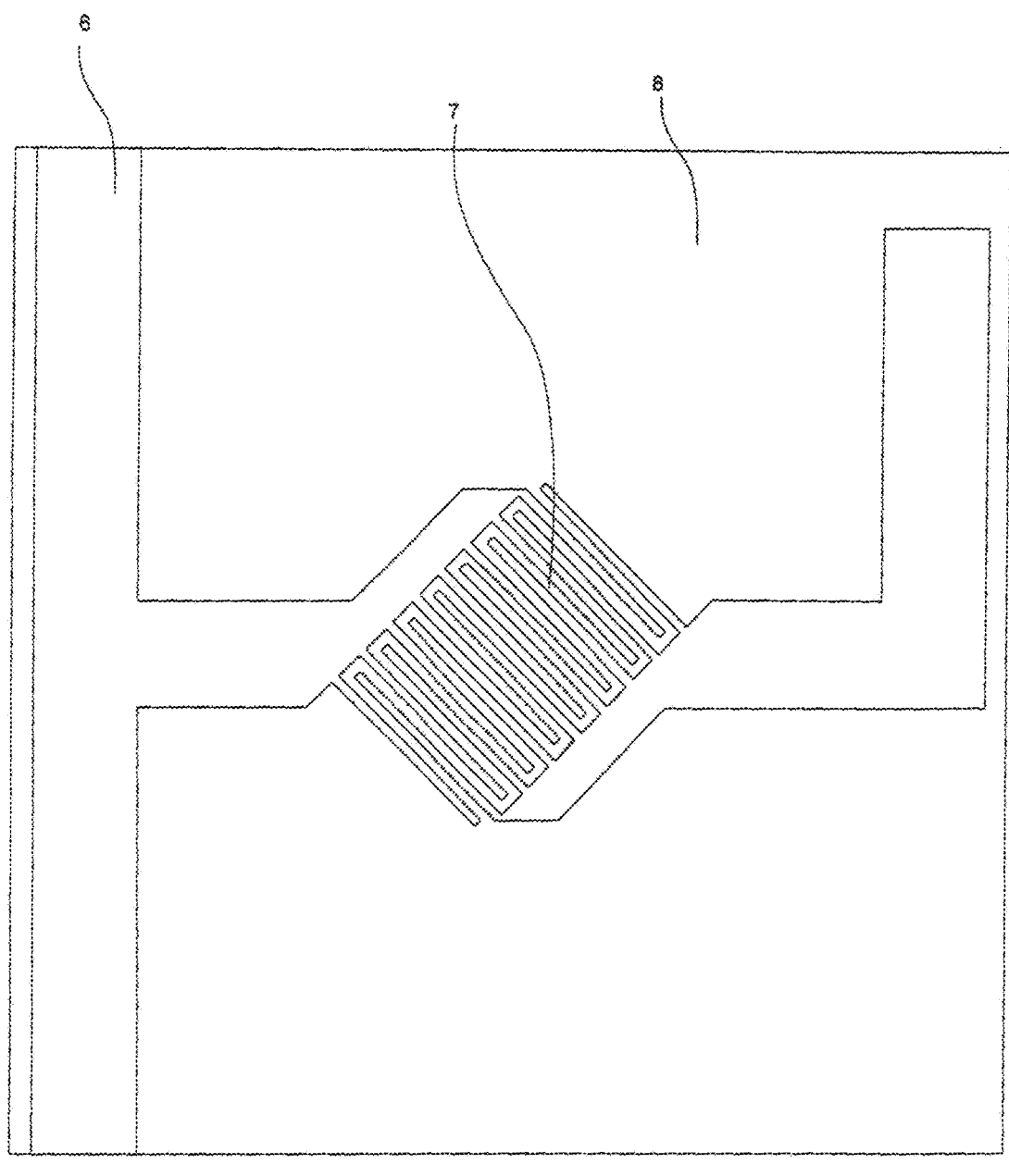
FIG. 4 shows a shunt pattern.

In one embodiment, where the protrusion 2 and a piezoresistive material form a single force transducing-protrusion component 33, there is no need for an air gap between this element and the electrical shunt circuit 7, since varying conductance arises not from increased contact between FSR and the shunt pattern, but from increased conductance within the volume of the mechanically compressed variably resistive protrusion 2 (FIG. 4).

A last process of printing or otherwise applying onto the upper face of the lower supporting layer 8, consisting of lines 4 of conducting ink running east-west. In one embodiment, conducting lines are spaced every 6.0 mm.

An intermediate step of printing onto the upper face of the lower supporting layer 8 of dielectric ink. In one embodiment, a patch 5 of dielectric ink is placed every 6.0 mm in a square grid arrangement.

A first printing onto the upper face of the lower supporting layer 8, consisting of lines 6 of conductive ink running north-south, In one embodiment, conducting lines are spaced every 6.0 mm.

A shunt circuit 7 pattern included with this first printing. In one embodiment this pattern is placed every 6.0 mm.

A supporting layer 8. In one embodiment which is a display 23 device, this layer can be either entirely transparent or can contain transparent regions.

An optional diode at each grid intersection. In one embodiment this diode can be printed (FIG. 6).

In one embodiment, the sensor arrays 20 are produced via a screen printing process where each step of printing ink described above is printed in the desired patterns using screen printing then cured before continuing to the next step. Other embodiments could be produced using flexographic or photogravure processes.

Only standard manufacturing techniques are required to attain the resultant structure.

User Experience

The sensor array 20 functions exactly as previous instantiations of MFR. When time-varying touches impinge upon the top surface of the topmost supporting layer, these touches are converted into a time-varying antialiased image of the impinging force.

Internal Operation

In the following description, specific details are provided to improve understanding of the inventions and for illustrative purposes and are not meant to be restrictive. In particular the specific force transducer is not essential, so long as it exhibits either piezoresistive characteristics (when force or mechanical strain is applied to the material, electrical resistance changes) or capacitance characteristics (when force or mechanical strain is applied to the material, electrical capacitance changes). or any other means of converting force or mechanical strain into electrical signal. Force sensitive resistor or FSR is used below to represent the corpus of such materials, and should be construed to any one particular material or composite exhibiting such characteristics.

When an external force impinges upon the topmost supporting layer 1, the resulting force is concentrated by the protrusions 2, thereby onto the FSR component 3 which is compressed underneath each protrusion 2 onto the shunt circuit 7, and increasing the contact between the FSR component 3 and the shunt circuit 7. This increased contact increases the conductance between the first printed lines of conductive ink 6 and the second printed lines of conductive ink 4, which would otherwise be insulated from each other where they cross by the printed dielectric 5 (FIGS. 2 & 3).

In an embodiment using the combined FSR-protrusion component 33, an external force impinges upon the topmost supporting layer 1, and this force becomes concentrated by the protrusions 2.

Because each protrusion 2 contains a coating 3 of pressure sensitive conductive material, the resulting compression increases electrical conductance within the interior of its volume. This increased conductance allows more current to flow within the conductive sheet from the portion of the shunt circuit 7 which is connected to a voltage source to the portion of the shunt circuit 7 which is connected to an input, generally a circuit or IC with an ADC (FIG. 9).

Each row/column combination of the sensor array 20 is scanned in turn by a computer 22, so that at each time step the shunt circuit 7 at one unique row and column is exposed to a voltage source on one side and to an analog input on the other. This scan results in measurement of the electrical conductance at each row/column junction, and this information is used by the computer 22 to form an image of pressure.

As with all MFR devices, an external force which impinges downward on the topmost supporting layer (1), at a location intermediate between protrusions 2, results in the downward force being fractionally distributed among different FSR patches 3 and their corresponding shunt circuits 7. As [ROSENBERG] teaches, the computer 22 (FIG. 9) is able to interpret this mix of sensed pressures to determine the centroid of the impinging touch.

Figure 7:
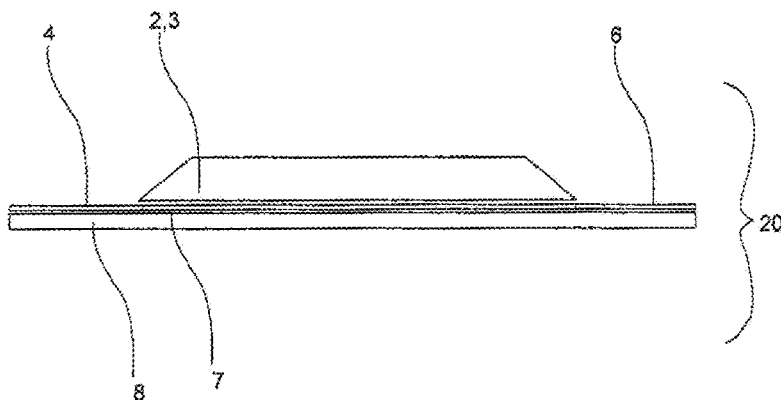
FIG. 7 shows an implementation where the force sensing material is the protrusion and printed above a shunt pattern.

FIG. 7 shows a cross-sectional view of a single protrusion 2, in an embodiment in which the protrusion 2 also functions as a volumetric piezoresistive element 3 that rests on top of a shunt circuit 7.

Figure 8:
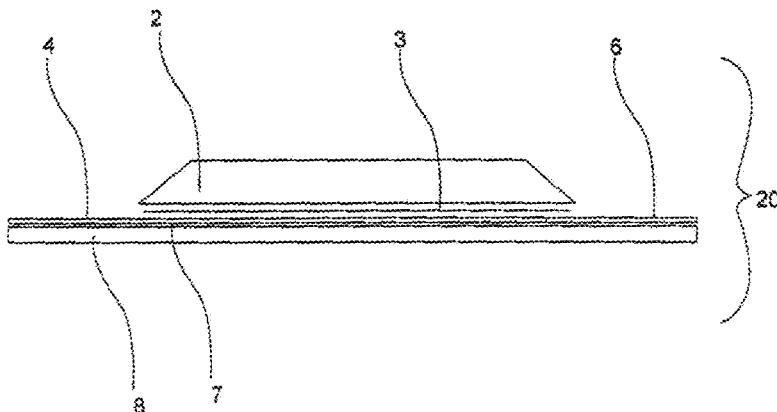
FIG. 8 shows an implementation where the protrusion is printed above the force sensing material, which is printed above a shunt pattern.

FIG. 8 shows a cross-sectional view of a single protrusion 2, in an embodiment in which the protrusion 2 is a separate element from a piezoresistive element 3 that is affixed to the bottom surface of the protrusion. This piezoresistive element can be either a surface-effect piezoresistive element resting on top of a shunt circuit 7, or a volumetric piezoresistive element that is positioned on top of a shunt circuit 7.

Embodiment using only a tapered protrusion on a first, lower layer.

In one embodiment, no FSR material is required, because force measurement is made by the compression of a compliant dielectric material 5, which also may functions as the mechanical protrusion 2 (FIG. 5). This protrusion is placed between a second, upper printed strip of conducting ink 4 and a first, lower printed strip of conducting ink 6. All of these elements are affixed to a first, lower supporting layer 8. In one embodiment this compressible dielectric material 8. In one embodiment this compressible dielectric material is silicone rubber. This mechanical protrusion 2 can be tapered so that it is wider on its underside than on its top side. This tapering allows a stronger electrical connection along the printing of the upper, first printed strip of conducting ink 4 than if the protrusion were not tapered.

In another embodiment, no dielectric material is required, because force measurement is made by the compression of a pressure sensitive conductive material 3, which also functions as the mechanical protrusion 2 (FIGS. 5 & 6). This protrusion is placed between a second, upper printed strip of conducting ink 4 and a first, lower printed strip of conducting ink 6. All of these elements are affixed to a first, lower supporting layer 8. This mechanical protrusion 2 can be tapered so that it is wider on its underside 18 than on its top side. This tapering allows a stronger electrical connection along the printing of the upper, first printed strip of conducting ink 4 than if the protrusion were not tapered.

As already described herein, all of the active structures of the sensor array 20 can be built on a single support surface, as opposed to requiring at least two surfaces to contain structures of the sensor.

Figure 10:
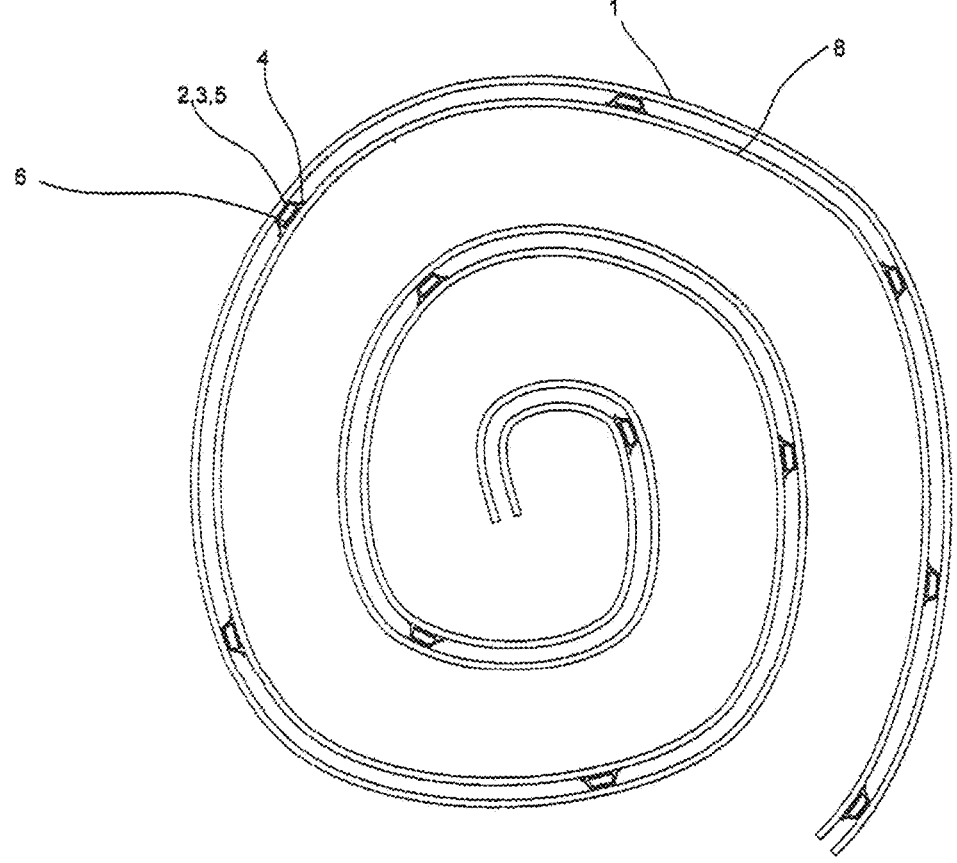
FIG. 10 shows an implementation where the single-support MFR sensor is rollable.
Figure 11:
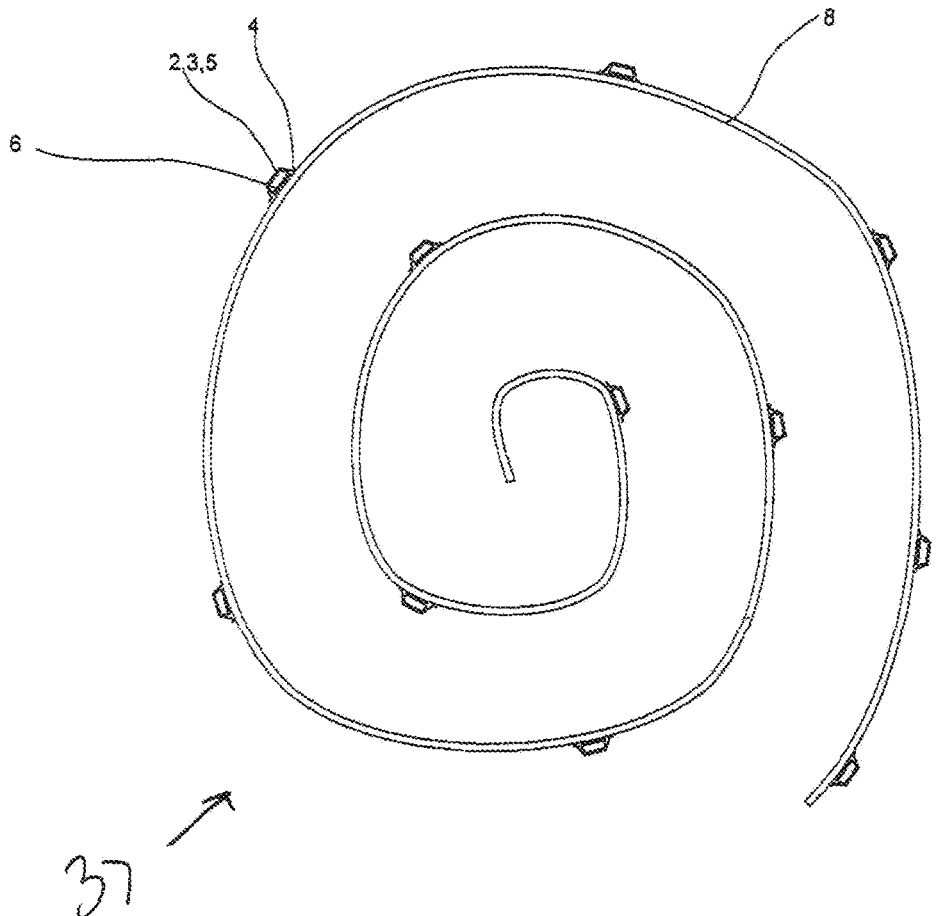
FIG. 11 shows an implementation where the single-support MFR sensor is rollable and does not require an upper support layer.

This feature allows, in one embodiment, a form factor that is two feet wide by six feet long by ⅛" thick, with a substrate of PVC or latex, or other flexible material having similar mechanical properties to PVC or latex, and that is both flexible and able to be rolled for storage and transport (FIGS. 10 & 11).

One reason that this added flexibility is advantageous is that the more flexible a sensor is, the less prone to breakage and damage it is.

Also, because all of the active structures are built on a single support surface, there is no need to maintain alignment between two or more mechanically distinct surfaces. Therefore, rolling and unrolling of the sensor array 20 does not create the possibility of misalignment or potential damage resulting from strain on adhesives meant to hold two layers of a sensor together. This is a feature that was not present in any previous description of MFR sensors (FIGS. 10 & 11).

In addition, in all previous descriptions of MFR sensors, an FSR surface was placed into contact with either another FSR layer or a conducting element, with the FSR surface separated from the other element by a very small air gap. In the current invention, there is no need for FSR material to be in such contact. This arrangement had the deficiency that any lateral movement of the FSR with respect to the surface it is facing can cause abrasion of the FSR material as the two facing surfaces shift against each other, and therefore can cause damage to the sensor. In the currently described embodiment, there is no longer any possibility of such lateral forces being applied to the surface of FSR material, and therefore this potential source of damage is removed.

In particular, in previous embodiments of MFR sensors, when the sensor is rolled up, the two facing layers can slide past each other. Because the two layers are nested one inside the other in the spiral shape of the roll 37 (FIGS. 10 & 11), each of these two layers will each end up at a slightly different roll 37 radius where they come into mutual contact, which results in a lateral shift between their respective surfaces. This shift can lead to abrasion of the FSR material. In the single layer embodiment of the current invention herein newly described, there is no such slippage between multiple layers, and therefore no potential for damaging abrasion.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A mechanical force redistribution (MFR) sensor array comprising: a first supporting layer; a second supporting layer; a plurality of individual distinct separate and apart force sensing components disposed between the first and second supporting layers; and a plurality of individual distinct separate and apart protrusions combined with the force supporting components, where there are only two supporting layers, when a force is applied to the second supporting layer, the force causes the second supporting layer to contact protrusions so the force is transmitted through the protrusions to the force supporting components and through the force supporting component whereby each individual force sensing component and each individual protrusion define a single individual force sensing protrusion component.

2. The array of claim 1 wherein each protrusion has an underside and the force sensing component is a coating on the underside of each protrusion.

3. The array of claim 2 whereby each force sensing protrusion component is affixed atop a corresponding shunt circuit below the force sensing protrusion component and not to the underside of the second supporting layer and all components are attached to the first supporting layer so no components are affixed to the second supporting layer and the second supporting layer has a smooth flat surface, the plurality of single individual protrusion components alongside each other and together define a plane in parallel with the first supporting layer.

4. The array of claim 3 in which only the first of the first and second supporting layers contains electronic components, whereas the second supporting layer is a simple undifferentiated flat sheet of material, made of metal, wood, glass or other semi-rigid material, that acts as a topmost touch layer.

5. The array of claim 4 including a plurality of lines of conducting ink disposed on the first supporting layer connected to all shunt circuits along which electrical signals travel.

6. The array of claim 5 including a patch of dielectric material disposed at each intersection of lines, with the patch having an area about a little larger than the intersection area.

7. The array of claim 6 wherein each protrusion and each sensing component are one piece made out of force sensitive resistor (FSR) material.

8. The array of claim 7 wherein the sensor array is rolled up into a roll when not in use.

9. The array of claim 8 embedded in a display.

10. The array of claim 1 in which the first supporting layer acts as a topmost touch layer, an electronics bearing surface of the first supporting layer faces downward away from a sensed external force, and in which a second, undifferentiated supporting layer is positioned underneath the first supporting layer.

11. The array of claim 10 in which the second supporting layer is an external surface, the external surface is a floor or wall or table top or desk top, underneath the first supporting layer so that the sensor itself contains only a single supporting layer.

12. A method for sensing comprising the steps of: imparting force from above onto a top surface layer of an MFR sensor array having only two supporting layers, a plurality of individual distinct separate and apart force sensing components disposed between the first and second supporting layers; and a plurality of individual distinct separate and apart protrusions combined with the force supporting components whereby each individual force sensing component and each individual protrusion define a single individual force sensing protrusion component; causing prompting signals by a computer in communication with the sensor array to be sent to the sensor array; and reconstructing with the computer a continuous position of force on the surface layer from interpolation based on data signals received from a grid of wires in the array.

13. The method of claim 12 including the step of rolling up the sensor array.

* * * * *